United States Patent Office 3,539,558
Patented Nov. 10, 1970

3,539,558
3 - OXYGENATED 3 - (9α,11β - DICHLORO-17β-HYDROXYANDROSTEN - 17α-YL)PROPIONIC ACID γ-LACTONES AND CONGENERS
Edward A. Brown, Wilmette, Ill., assignor to G. D. Searle & Co., Chicago, Ill., a corporation of Delaware
No Drawing. Filed Aug. 9, 1968, Ser. No. 751,370
Int. Cl. C07c 173/00
U.S. Cl. 260—239.57                                              6 Claims

ABSTRACT OF THE DISCLOSURE

Preparation of the captioned compounds—for example, 3-(9α,11β-dichloro-17β-hydroxyandrost-4-en-3-on-17α-yl)propionic acid γ-lactone—and their valuable pharmacological properties—including anti-estrogenic and progestational activity—are disclosed.

---

This invention relates to 3-oxygenated 3-(9α,11β-dichloro-17β-hydroxyandrosten - 17α - yl)propionic acid γ-lactones and processes for the preparation thereof. More particularly, this invention provides new, useful, and unobvious steroids of the formula

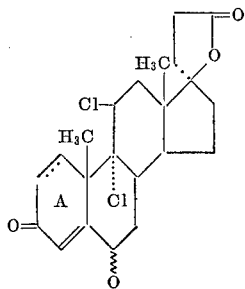

wherein X represents hydrogen or chlorine in either α or β configuration and the dotted line in ring A represents optional $\Delta^1$ unsaturation solely when X represents hydrogen. Also within the purview of this invention are lower alkyl enol ethers of the foregoing compounds having the formula

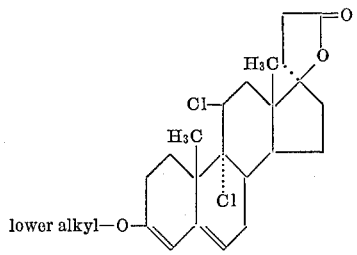

among which the ethyl enol ether is preferred.

The compounds to which this invention relates are useful by reason of their valuable pharmacological properties. Thus, for example, they are anti-estrogenic and progestational.

The anti-estrogenic utility of the instant compounds is evident from the results of a standardized test for their capacity to antagonize the stimulatory effect of estrone on uterine growth in immature mice. Procedure is substantially the same as that described by Edgren et al. in Proc. Soc. Exper. Biol. Med., 94, 537 (1957). White, female, 21-day old mice maintained on a synthetic, estrogen-free diet are used as test animals. To each of a group of 6–10 such animals, 0.1 mcgm. of estrone dissolved in 0.1 ml. of corn oil is administered subcutaneously and test compound dissolved or suspended in corn oil is administered subcutaneously or buccally, on each of 3 successive days. Commonly, the initial total dose of compound is 1 mg. in 0.1 ml. of corn oil administered subcutaneously in 3 equal portions. A second group of 6–10 animals identically and concurrently treated except that no test compound is administered serves as controls. The day after treatment is concluded, the animals are sacrificed; and the uteri are exercised, dissected free of extraneous tissue, blotted to express contained fluid, and individually weighed. A compound is considered active if the mean uterine weight of the animals treated therewith is significantly ($P \leq 0.01$) less than the mean uterine weight of the controls. Potency of an active compound, relative to progesterone, is determined by repeating the test at progressively diminishing doses sufficient to fit a log dose response curve by the method of least squares to a corresponding curve for progesterone developed by substituting 200, 100, and 50 mcgm. of progesterone, administered subcutaneously, for test compound in the foregoing procedure. From these curves, a dose of compound and a dose of progesterone which produce an identical decrease in mean uterine weight are selected, the second value is divided by the first, and the quotient is multiplied by 100 to give the percent potency.

The progestational utility of the instant compounds is evident from the results of a standardized test for their capacity to induce arborization of the endometrial glands in immature, estrogen-primed rabbits. The procedure is a modification of that described by Clauberg in C. Zentr. Gynakol, 54, 2757 (1930). Immature female rabbits weighing about 1 kg. and primed with 17β-estradiol by subcutaneously injecting 5 mcgm. thereof per animal on each of 6 successive days are used in this test. To each of a group of 3–4 such animals, beginning the next day after the last priming injection, test compound dissolved or suspended in corn oil is administered subcutaneously or buccally on each of 5 successive days. Commonly, the initial daily dosage is 1 mg. of compound in 0.1 ml. of corn oil administered subcutaneously. Other animals likewise administered corn oil alone serve as controls. On the 6th day after the last priming injection, the animals are sacrificed; and a segment of each uterus is taken for histological examination whereby the degree of arborization of the endometrial glands is graded in accordance with a method similar to that described by McPhail in J. Physiol., 83, 145 (1934). A +1 response represents the effect of estrogen priming alone and is indicated by the absence of glandular proliferation. A +2 response is defined as that induced in the estrogen-primed animal by 0.05 mg. of progesterone administered subcutaneously, and is considered to represent minimal progestational activity. Responses in the range +3 to +4 reflect potent progestational effects typical of those produced by 0.1 mg. of subcutaneous progesterone. If the average reading for the test animals is less than +2 at the 1 mg. dose level, the compound is considered inactive. If the average rating at this dose is greater than +2, the test is repeated with compound administered in progressively lesser amounts until the dose required to produce an average rating of precisely +2 can be determined. Potency of the compound relative to progesterone, is then calculated by dividing this dose into 0.05 and multiplying by 100.

Those skilled in the art will recognize that observations of activity in standardized tests for particular biological effects are fundamental to the development of valuable new drugs, both veterinary and human.

Preparation of the $\Delta^1$ compound of this invention proceeds by consecutively contacting a cold solution of 3-(17β-hydroxyandrosta-1,4,9(11)-trien-3-on-17α - yl)propionic acid γ-lactone (U.S. 3,095,412) and lithium chloride in acetic acid with N-chlorosuccinimide and a tetrahydrofuran solution of hydrogen chloride. The same procedure applied to 3-(17β-hydroxyandrosta-4,9(11)-dien-3-on-17α-yl)propionic acid γ-lactone (U.S. 2,925,416) affords the corresponding 1,2-dihydro analog, from which, on contacting with a tri(lower alkyl) orthoformate in the presence of p-toluenesulfonic acid monohydrate, using dioxan as the reaction medium, the corresponding enol ether of the invention is obtained. Any of the enol ethers is converted in cold acetone solution to the 6β-chloro compound hereof by consecutive contact with aqueous sodium acetate and N-chlorosuccinimide. Epimerization of the 6β-chloro substituent is effected by contacting with hydrogen chloride in acetic acid solution, yielding the 6α-chloro compound of the invention.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3-(9α,11β-dichloro-17β-hydroxyandrost-4-en-3-on-17α-yl) propionic acid γ-lactone To a solution of 100 parts of 3-(17β-hydroxyandrosta-4,9(11)-dien-3-on-17α-yl)propionic acid γ-lactone and 400 parts of lithium chloride in 4000 parts of acetic acid at approximately 5° is added, with stirring, 43 parts of N-chlorosuccinimide followed by a solution of 12 parts of hydrogen chloride in approximately 110 parts of tetrahydrofuran. The resultant solution is stirred for 2¾ hours at room temperature, then poured into 8 volumes of water. The precipitate thrown down is filtered off, washed with water, dried in air, and recrystallized from ethyl acetate to give 3-(9α-11β-dichloro-17β-hydroxyandrost - 4-en-3-on-17α-yl)propionic acid γ-lactone melting at 193–197° with decomposition. The product has the formula

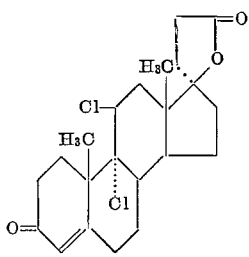

EXAMPLE 2

3-(9α,11β-dichloro-17β-hydroxyandrosta-1,4-dien-3-on-17α-yl)propionic acid γ-lactone To a solution of 50 parts of 3-(17β-hydroxyandrosta-1,4,9(11)-trien-3-on-17α-yl)propionic acid γ-lactone and 250 parts of lithium chloride in 2500 parts of acetic acid at approximately 5° is added, with stirring, 28 parts of N-chlorosuccinimide followed by a solution of approximately 8 parts of hydrogen chloride in 77 parts of tetrahydrofuran. The resultant solution is stirred at 5° for 30 minutes, then allowed to warm to room temperature while stirring is continued for 4 hours. The solution is thereupon poured into 6 volumes of ice water. The precipitate which forms is isolated by filtration, washed with water, dried in air, and recrystallized from a mixture of chloroform and ethyl acetate to give 3-(9α,11β-dichloro-17β-hydroxyandrosta-1,4-dien-3-on - 17α-yl)propionic acid γ-lactone melting at 213–217°. The product has the formula

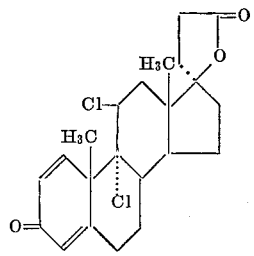

EXAMPLE 3

3-(9α,11β-dichloro-3-ethoxy-17β-hydroxyandrosta-3,5-dien-17α-yl)propionic acid γ-lactone A solution of 20 parts of 3-(9α,11β-dichloro-17β-hydroxyandrost - 4-en-3-on-17α-yl)propionic acid γ-lactone, approximately 19 parts of triethyl orthoformate, 1 part of p-toluenesulfonic acid monohydrate, and 152 parts of dioxan is stirred in a nitrogen atmosphere for 1½ hours, whereupon 16 parts of pyridine is introduced. The resultant solution is poured into 8 volumes of ice water. The precipitate which forms is filtered off, washed with water, dried in air, and recrystallized from methanol containing just sufficient pyridine to induce basicity. The resultant product is 3-(9α-11β-dichloro-3-ethoxy-17β-hydroxyandrosta-3,5-dien-17α-yl)propionic acid γ-lactone melting at 161–167°. The product has the formula

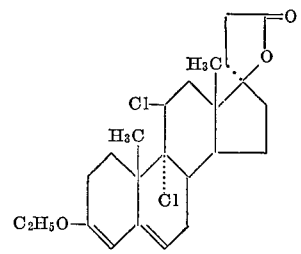

EXAMPLE 4

3-(6β,9α,11β-trichloro-17β-hydroxyandrost-4-en-3-on-17α-yl)propionic acid γ-lactone To a solution of 65 parts of 3-(9α,11β-dichloro-3-ethoxy-17β-hydroxy-androsta - 3,5-dien-17α-yl)propionic acid γ-lactone in 1900 parts of acetone is added a solution of 41 parts of sodium acetate in 257 parts of water. The resultant solution is cooled to around 5°, whereupon approximately 41 parts of N-chlorosuccinimide followed by 50 parts of acetic acid is stirred in. Stirring at around 5° is continued for 2 hours, whereupon 2500 parts of water is introduced and the mixture thus obtained held at 5° for 1 hour. The precipitate thrown down is filtered off, washed with water, dried in air, and recrystallized from ethyl acetate to give 3-(6β,9α,11β-trichloro-17β-hydroxyandrost-4-en-3-on-17α-yl)propionic acid γ-lactone melting at 196–198° with gas evolution. The product has the formula

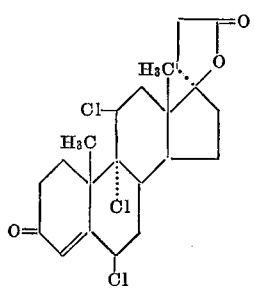

EXAMPLE 5

3-(6α,9α,11β-trichloro-17β-hydroxyandrost-4-en-3-on-17α-yl)propionic acid γ-lactone Hydrogen chloride is passed slowly through a solution of 15 parts of 3-(6β,9α,11β-trichloro-17β-hydroxyandrost-4-en-3-on-17α-yl)propionic acid γ-lactone in 500 parts of acetic acid for 3 hours at ambient temperatures. The resultant mixture is allowed to stand for 16 hours at room temperature, then poured into 8 volumes of ice water. The precipitate which forms is filtered off, washed with water, dried in air, and recrystallized from ethyl acetate to give 3-(6α,9α,11β-trichloro - 17β-hydroxyandrost-4-en-3-on-17α-yl)propionic acid γ-lactone melting at 214–216° with decomposition. The product has the formula

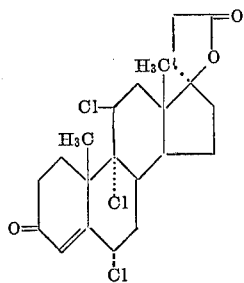

What is claimed is:
1. A compound selected from the group consisting of 3-(9α,11β-dichloro - 3-ethoxy - 17β-hydroxyandrosta-3,5-dien-17α-yl)propionic acid γ-lactone and compounds of the formula

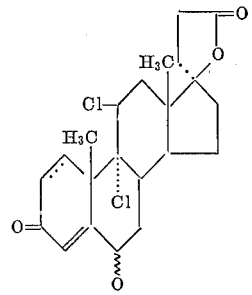

wherein X represents hydrogen or chlorine in either α or β configuration and the dotted line in ring A represents optional $\Delta^1$ unsaturation solely when X represents hydrogen.

2. A compound according to claim 1 which is 3-(9α, 11β-dichloro - 3-ethoxy-17β-hydroxyandrosta - 3,5-dien-17α-yl)propionic acid γ-lactone.

3. A compound according to claim 1 which is 3-(9α, 11β-dichloro - 17β-hydroxyandrost - 4-en-3-on - 17α-yl) propionic acid γ-lactone.

4. A compound according to claim 1 which is 3-(9α, 11β-dichloro - 17β-hydroxyandrosta - 1,4-dien-3-on-17α-yl)propionic acid γ-lactone.

5. A compound according to claim 1 which is 3-(6β, 9α,11β-trichloro - 17β-hydroxyandrost - 4-en - 3-on-17α-yl)propionic acid γ-lactone.

6. A compound according to claim 1 which is 3-(6α, 9α,11β-trichloro - 17β-hydroxyandrost - 4-en-3-on-17α-yl) propionic acid γ-lactone.

References Cited
UNITED STATES PATENTS 2,925,416   2/1960   Brown et al.
3,095,412   6/1963   Brown.

HENRY A. FRENCH, Primary Examiner

U.S. Cl. X.R.

424—241

PO-1050
(5/69)

UNITED STATES PATENT OFFICE
CERTIFICATE OF CORRECTION

Patent No. 3,539,558   Dated November 10, 1970

Inventor(s)   Edward A. Brown

It is certified that error appears in the above-identified patent and that said Letters Patent are hereby corrected as shown below:

Column 1, the first formula,

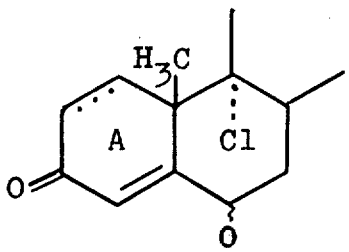   should be -- 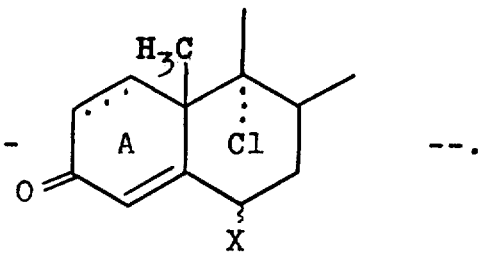 --.

Column 2, line 6, "exercised" should be --excised--.

Column 6, the first formula,

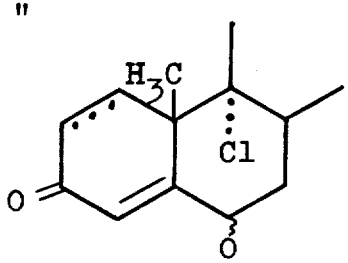   should be -- 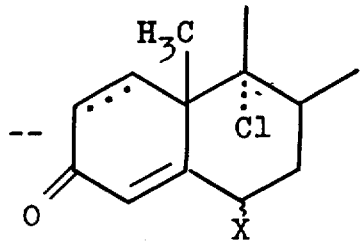 --.

SIGNED AND
SEALED
FEB 9 1971

(SEAL)
Attest:

Edward M. Fletcher, Jr.
Attesting Officer

WILLIAM E. SCHUYLER, JR.
Commissioner of Patents